United States Patent [19]
Priebe, Jr.

[11] 3,786,351
[45] Jan. 15, 1974

[54] SPECTRUM ANALYZER WITH SIMULTANEOUS DISPLAY FOR PLURAL FREQUENCY BANDS

[75] Inventor: Henry Fred Priebe, Jr., Dunwoody, Ga.

[73] Assignee: Bell Telephone Laboratories, Incorporated, Murray Hill, Berkeley Heights, N.J.

[22] Filed: July 7, 1972

[21] Appl. No.: 269,512

[52] U.S. Cl............................................. 324/77 B
[51] Int. Cl............................................. G01r 23/16
[58] Field of Search.............. 324/77 E, 77 R, 77 B; 179/15 A

[56] References Cited
UNITED STATES PATENTS
2,983,870  5/1961  Wallace ........................... 324/77 C
2,577,758  12/1951  Hastings........................... 324/77 E
3,241,064  3/1966  Bartels et al. ...................... 324/77 E

*Primary Examiner*—Alfred E. Smith
*Attorney*—W. L. Keefauver, John C. Albrecht

[57] ABSTRACT

A spectrum analyzer which generates a frequency spectrum signal for each of a plurality of frequency bands in an input signal and displays all generated frequency spectrum signals simultaneously is disclosed. Specifically, the spectrum analyzer disclosed utilizes a mixer to heterodyne an input signal with a selected multiple of a base frequency. Time-shared apparatus is then used to scan a selected band of frequencies in the filtered signal output of the mixer. The resulting signal is detected and summed with a bias level selected from a plurality of bias levels and is displayed during one sweep of an oscilloscope screen.

11 Claims, 2 Drawing Figures

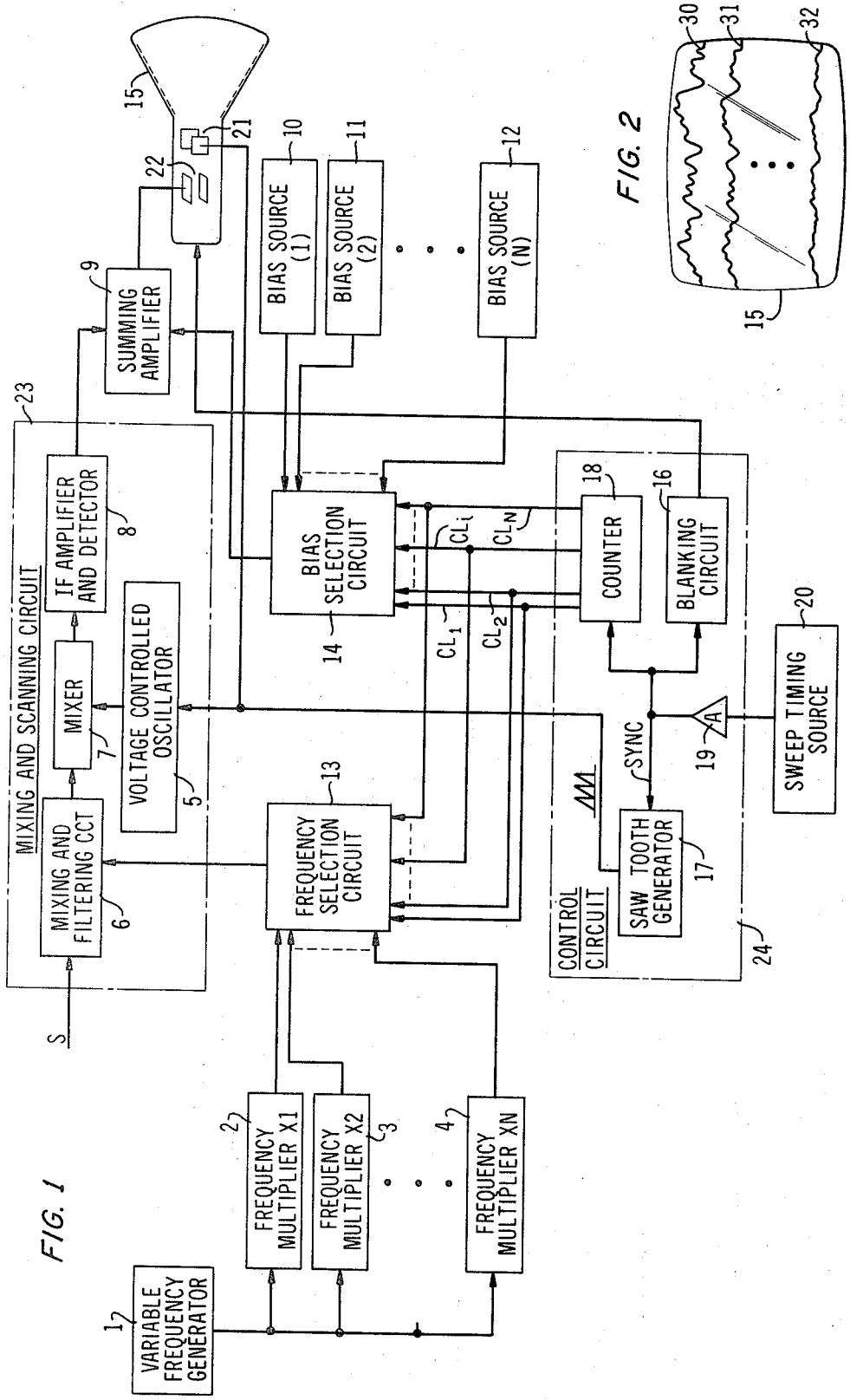

SPECTRUM ANALYZER WITH SIMULTANEOUS DISPLAY FOR PLURAL FREQUENCY BANDS

BACKGROUND OF THE INVENTION

1. Field of the Invention

This invention relates to the field of spectrum analyzers and, more specifically, to spectrum analyzers which generate a plurality of frequency spectrum signals.

2. Description of the Prior Art

The field of spectrum analyzers has developed steadily over the years. The resulting methods and techniques for improving the accuracy of spectrum analyzers have made them important analysis tools in many fields. Of particular interest has been the development of spectrum analyzers for generating and displaying frequency spectrum signals for a plurality of bands of frequencies in an input signal. One such spectrum analyzer is shown in C. R. Hurtig et al., U.S. Pat. No. 3,473,121, issued Oct. 14, 1969. The analyzer shown in the Hurtig patent generates and displays on individual display screens spectrum signals for a plurality of bands of frequencies determined by the passbands of individual filters. For many applications this type of analyzer is quite adequate, even though the bands of frequencies for which the analyzer generates spectrum signals can be changed only by manually changing the filters in the analyzer. Applications do exist, however, in which it would be useful for the analyzer to be more easily changed from one set of frequency bands to another. In addition, in some applications it would be desirable that only one display device should be required to display all of the spectrum signals simultaneously.

SUMMARY OF THE INVENTION

The spectrum analyzer of applicant's invention generates frequency spectrum signals for a plurality of frequency bands in an input signal, wherein the bands of frequencies are determined by a plurality of local frequency sources. All resulting spectrum signals are displayed on a single display device. Specifically, one spectrum analyzer, according to applicant's invention, utilizes time-shared frequency scanning apparatus in conjunction with a plurality of local frequency sources to generate frequency spectrum signals for a plurality of bands of frequencies in a single input signal. Each of the frequency spectrum signals is displayed during a single sweep of an oscilloscope screen using one of a plurality of bias levels to displace the sweep to a selected area of the screen. In this manner, all spectrum signals are displayed simultaneously on the screen.

It is an object of the invention to provide a spectrum analyzer for generating and displaying frequency spectrum signals for a plurality of frequency bands.

It is another object of the invention to provide a spectrum analyzer which employs time-shared apparatus to generate and display frequency spectrum signals for a plurality of frequency bands in an input signal.

It is yet another object of the invention to provide a spectrum analyzer employing time-shared frequency scanning apparatus in conjunction with a plurality of local frequency sources to generate a frequency spectrum signal for each of a plurality of frequency bands within an input signal.

BRIEF DESCRIPTION OF THE DRAWING

FIG. 1 shows a block diagram of a spectrum analyzer embodying applicant's invention.

FIG. 2 shows a representation of the display on an oscilloscope screen of the spectrum signals produced by the spectrum analyzer shown in FIG. 1.

DESCRIPTION OF THE ILLUSTRATIVE EMBODIMENT

Generally, the operation of the illustrative embodiment shown in FIG. 1 is as follows. The input signal S is applied to the mixing and scanning circuit 23 (FIG. 1) wherein an amplitude signal is generated as a selected band of frequencies in the signal S is scanned. The band of frequencies for which the mixing and scanning circuit 23 generates an amplitude signal is dependent upon the frequency of the output signal from the frequency selection circuit 13. The frequency of the output signal from the selection circuit 13 is referred to as the band selection frequency and is selected in response to an enable signal appearing on one of the lines $CL_1$ through $CL_N$ from the control circuit 24. More particularly, when, for example, the signal on the line $CL_1$ is an enable signal, the selection circuit 13 passes the output signal from frequency multiplier 2 to the mixing and scanning circuit 23.

The aforementioned amplitude signal generated by the mixing and scanning circuit 23 (FIG. 1) is applied to the summing amplifier 9 where a bias level from the bias selection circuit 14 is combined with the amplitude signal to produce an output signal for application across the vertical deflection plates 22 of the oscilloscope 15. As in the case of the frequency selection circuit 13 previously mentioned, the bias selection circuit 14 is controlled by the signals on the lines $CL_1$ through $CL_N$ from the control circuit 24. When, as above, the signal on the line $CL_1$ is an enable signal from the control circuit 24, the bias selection circuit 14 selects the output signal from the bias source 10 for application to the summing amplifier 9. Thus, when the signal on the line $CL_1$ is an enable signal, the amplitude signal generated by the mixing and scanning circuit 23 for a band of frequencies determined by the frequency of the output signal from the frequency multiplier 2 is combined in summing amplifier 9 with the output signal from bias source 10. The resulting signal is then displayed on a portion of the oscilloscope 15 screen determined by the amplitude of the output of the bias source 10. A representation of the resulting display is shown in FIG. 2 as trace 30.

Having generally described the processing performed upon the signal S, attention is now turned to the detailed consideration of the operation of the entire analyzer. It should be noted here that the mixing and scanning circuit 23 (FIG. 1), the summing amplifier 9, and the oscilloscope 15 are time-shared for use with a plurality of band selection frequencies from the frequency selection circuit 13 and bias levels from the bias selection circuit 14. Each band selection frequency and corresponding bias level is assigned a time slot and the processing just described for the signal S is conducted for each such band selection frequency and bias level in the respective time slot. As previously described, the particular band selection frequency and bias level selected for a time slot by the selection circuits 13 and 14, respectively, are determined by the line of the group of lines $CL_1$ through $CL_N$ on which an enable signal from the control circuit 24 appears. To fully illustrate the overall operation of this time-shared analyzer, a simple example will be used below.

It is first to be noted that the length of each time slot is determined in part by the frequency $f_s$ of the sweep timing source 20 (FIG. 1). The frequency of the source 20 is selected sufficiently high to ensure that the display of the generated spectrum signals on the screen of the oscilloscope 15 is refreshed often enough that flicker of the screen is avoided. The output signal of the sweep timing source 20 is applied to the high gain amplifier 19 which produces an output signal approximating a square wave with the same frequency as that of the source 20. This output is supplied to the counter 18 which counts each positive going pulse of the output of the amplifier 19 up to a maximum count of N at which point the counter recycles. As the counter 18 counts the pulses from the amplifier 19, it sequentially supplies an enable signal to one of the lines $CL_1$ through $CL_N$.

The output of the amplifier 19, it will be recalled, is substantially a square wave at the frequency of the source 20 (FIG. 1). In addition to its output being applied to the counter 18, its output is also applied to the saw tooth generator 17 as a synchronizing signal. More specifically, at each occurrence of a positive pulse from the output of the amplifier 19, the output of the saw tooth generator 17 is set equal to zero. In the interim, between the occurrences of pulses of the output of the amplifier 19, the output of the saw tooth generator 17 increases linearly with time thus forming a saw tooth waveform. In overall operation then, with the occurrence of each positive pulse of the output of the amplifier 19, the counter 18 advances its count by one and the saw tooth generator 17 resets is output to zero.

For illustrative purposes it is assumed that an enable signal from the counter 18 appears on the line $CL_1$ and that disable signals appear on all of the remaining lines $CL_2$ through $CL_N$. Furthermore, it is assumed that the output of the saw tooth generator 17 has just been reset to zero and its output amplitude is beginning to rise. Since an enable signal appears on the line $CL_1$, the output signal of the frequency multiplier 2 is selected by the circuit 13 for application to the mixing and filtering circuit 6. It should be noted that the output frequency of the frequency multiplier 2 is identical with the output frequency of variable frequency generator 1 since the multiplier factor for frequency multiplier 2 is one. Therefore, assuming the output frequency of the frequency generator 1 is equal to $f_b$, referred to as the base frequency, the output frequency of the frequency multiplier 2 is also equal to $f_b$. Furthermore, the band selection frequency $f_{BS}$ of the signal from the selection circuit 13 is equal to $f_b$.

It should at this point be noted that the frequency selection circuit 13 and the similar bias selection circuit 14 consist of any suitable means, such as a set of N reed relays, for responding to an enable signal appearing on one of the lines in the set $CL_1$ through $CL_N$ to select the output signal of one of N possible sources without making substantial changes in the signal output of the source selected. In addition, it should further be noted that individual local frequency sources could be used in place of the generator 1 and the frequency multipliers 2, 3, and 4.

The band selection signal from the frequency selection circuit 13 (FIG. 1) is supplied to the mixing and filtering circuit 6 in the mixing and scanning circuit 23. In the mixing and filtering circuit 6, which is well known in the art, the signal S is heterodyned with the signal from the selection circuit 13 and the resulting signal is filtered to produce only output frequencies in a selected band. More specifically, as is well known, the mixing operation generates two sets of signals from the input signal S. In the first set the frequencies of all signals comprising the input signal are shifted up by an amount equal to the frequency of the heterodyning frequency which, in this case, is the band selection frequency $f_{BS} = f_b$. In the second set of signals produced in the mixing operation, the frequencies of all signals comprising the input signal are shifted down by an amount equal to the band selection frequency $f_{BS} = f_b$. In the mixing and filtering circuit 6 a highly selective bandpass filter is provided to select only the signals having frequencies within a certain band from the signals produced by the mixing operation. The upper and lower band limits of the filter, $f_U$ and $f_L$, respectively, are selected such that the filter passes primarily only signals contained in the set of signals whose frequencies have all been shifted down by the mixing operation. Thus, the signals passed by the filter having frequencies bounded by $f_U$ and $f_L$ consist of those signals comprising the input signal S whose frequencies lie within the band having as a lower bound $f_{BS} + f_L$ and as an upper bound $f_{BS} + f_U$. In the specific example assumed above in which the band selection frequency $f_{BS}$ is equal to the base frequency $f_b$, the signals in the band $f_U$ through $f_L$ comprising the output of the mixing and filtering circuit 6 are the signals comprising the input signal S in the band $f_b + f_L$ through $f_b + f_U$ which have been shifted down in frequency by the mixing operation. This output from the circuit 6 is applied to the mixer 7.

As with the mixing and filtering circuit 6, the mixer 7 is known in the art. Specifically, it heterodynes the signal output of the mixing and filtering circuit 6 with the signal output of the voltage controlled oscillator 5. Thus, the output frequency of the voltage controlled oscillator 5 is used to shift the frequency of the signals comprising the output of circuit 6. Specifically, as will be seen below, the frequencies of the signals comprising the output of the circuit 6 are selectively shifted to the IF frequency of the IF amplifier and detector 8.

The output frequency of the oscillator 5 is determined by the amplitude of the signal from the saw tooth generator 17. When the amplitude of the signal from the saw tooth generator 17 is equal to zero, the output frequency of the oscillator 5 is equal to its minimum value determined by the expression $f_L - f_{IF}$ where $f_{IF}$ is the IF frequency used in the IF amplifier and detector 8 and $f_L$ is the lower bound on the frequencies in the filtered output of the circuit 6. As a result, the output of the mixer 7 contains a signal whose frequency is $f_{IF}$ and whose amplitude corresponds to that of the signal having the frequency $f_L$ in the output of the circuit 6. As the output of the saw tooth generator 17 rises in amplitude, the output frequency of the oscillator 5 also rises until, at the maximum value of the output of the saw tooth generator 17, the output frequency of the oscillator 5 reaches the value $f_U - f_{IF}$, where $f_U$ is the upper bound of the frequencies in the filtered output of the circuit 6. As a result, the output of the mixer 7 under such conditions contains a signal whose frequency is $f_{IF}$ and whose amplitude corresponds to that of the signal in the output of the circuit 6 having a frequency $f_U$.

With the assumed output of the oscillator 5, in response to the output of the saw tooth generator 17, the mixer 7 generates a signal with a frequency equal to $f_{IF}$ whose time varying amplitude represents a scan across the band of frequencies between $f_L$ and $f_U$ in the signals comprising the output of mixing and filtering circuit 6. Specifically, as the heterodyning frequency from oscillator 5 is increased linearly with time from its minimum to its maximum value, the mixer 7 generates a signal with a frequency of $f_{IF}$ which is modulated by the amplitudes of the signals comprising the output of the circuit 6. As was mentioned above, when the frequency of the signal from the oscillator 5 is at its minimum equal to $f_L - f_{IF}$, the signal shifted by the operation of the mixer 7 to the frequency $f_{IF}$ is the frequency $f_L$. As the frequency of the output of the oscillator 5 increases, the frequency shifted by the mixer 7 to the frequency $f_{IF}$ increases until the maximum frequency equal to $f_U - f_{IF}$ is reached and the signal being shifted is the signal in the output of the circuit 6 having the frequency $f_U$.

It should be noted that the maximum output of the saw tooth generator 17 occurs at the moment of the occurrence of the positive going pulse from the amplifier 19 which returns the output of the saw tooth generator 17 to zero. With the return of the output of the saw tooth generator 17 to zero, the output frequency of the oscillator 5 returns to its minimum value.

The signals comprising the output of the mixer 7 are applied to the IF amplifier and detector 8 wherein the signals having the frequency $f_{IF}$ are amplified and signals having other frequencies are severely attenuated. Following this highly frequency selective amplification, the signal is demodulated. The resulting output of the IF amplifier and detector 8 is a time varying signal representing the amplitude of the frequencies scanned in the signals comprising the output of the mixing and filtering circuit 6. This amplitude signal is applied to the amplifier 9 where it is summed with the signal output of the bias selection circuit 14.

The selection made by the bias selection circuit 14 is determined by the contents of the counter 18 (FIG. 1). It will be recalled that the signal on the line $CL_1$ is assumed to be an enable signal from the counter 18. This results in the selection of the signal output of bias source 10 by the selection circuit 14 for application to the summing amplifier 9. As mentioned above, the amplifier 9 sums the output of the detector 8 and the output of the selection circuit 14. Thereafter, the amplifier 9 applies the resulting signal to the vertical deflection plates 22 of the oscilloscope 15.

It should be noted that the saw tooth signal output of the generator 17 is applied not only to the oscillator 5 but also to the horizontal deflection plates 21 of the oscilloscope 15. Thus, as the output signal from the saw tooth generator 17 increases in amplitude and the variable oscillator 5 increases its output frequency, the beam of the oscilloscope 15 is deflected by the plates 21. In essence, the beam is horizontally deflected in proportion to the amplitude of the output signal from the saw tooth generator 17 while, simultaneously, the beam is deflected vertically in proportion to the output signal from the amplifier 9. As a result, the time varying amplitude signal output of the amplifier 9 representing the frequency spectrum of a band of frequencies in the signal S is displayed across the oscilloscope screen in the manner illustrated by trace 30 (FIG. 2). The display of this signal requires a complete time slot. To obtain best use of the display screen, the time slot length and the rate of horizontal beam deflection are selected to ensure the end of the current time slot when the horizontal deflection of the beam reaches its maximum limit.

In considering the completion of one time slot and the entry into another, it should be recalled first that the sweep timing source 20 (FIG. 1) supplies, through the amplifier 19, a synchronizing pulse and a counter pulse to the saw tooth generator 17 and the counter 18, respectively. It should also be recalled that at the moment when the saw tooth generator 17 receives the synchronizing pulse from the amplifier 19, the output of the oscillator 5 is at its highest frequency. At that same moment the oscilloscope beam is deflected to its maximum limit. As a result, the synchronizing pulse, by returning the output of the saw tooth generator to zero, also returns the oscilloscope beam to its undeflected position and the oscillator 5 to its maximum output frequency. It should now be observed that the pulse output of amplifier 19 is also supplied to the blanking circuit 16. During the period of time in which the oscilloscope beam is returning to its undeflected position, it is blanked by the blanking circuit 16.

In addition to the results of the occurrence of a pulse from amplifier 19 just described, the occurrence of the pulse also advances the counter 18 by one, indicating entry into a new time slot. The advanced count of the counter 18 removes the enable signal from the line $CL_1$ and supplies an enable signal to the line $CL_2$. As a result of the signal on the line $CL_2$ being an enable signal, the frequency selection circuit 13 selects the output signal from the frequency multiplier 3 for which the multiplier factor is two, to be applied to the mixer 7. As mentioned previously, changing the selection made by the circuit 13 changes the band selection frequency $f_{BS}$ which in part determines the frequencies of the signals comprising the output of the mixing and filtering circuit 6. Since the signal output of the variable frequency generator 1 has been assumed to have a frequency equal to $f_b$ and the output frequency of the multiplier 3 is, as a result, equal to $2f_b$, the band selection frequency $f_{BS}$ is also equal to $2f_b$. Thus, the band of frequencies in the signal S which are shifted by the mixing and filtering circuit 6 and appear within the band of output frequencies for the circuit 6 has a lower bound of $f_{BS} + f_L = 2f_b + f_L$ and an upper bound of $f_{BS} + f_U = 2f_B + f_U$. This band of frequencies, represented by the output of the circuit 6, is scanned as described above and a spectrum signal is generated at the output of the IF amplifier and detector 8.

In addition to the change in band selection frequency, the change in the contents of the counter 18 producing the enable signal on line $CL_2$ also results in the output signal from the bias source 11 being supplied to the amplifier 9 by the bias selection circuit 14. The selection of the output signal from the bias source 11, as opposed to the output signal from the bias source 10 which was selected previously, has the effect of moving the display of the signal generated by the IF amplifier and detector 8 to a different portion of the oscilloscope 15 screen than was used previously. As a result of this operation, it is possible to simultaneously display a plurality of signals upon the screen of the oscilloscope 15 with each signal being displayed in its own selected region of the screen. Therefore, as the detector 8 generates an amplitude signal for the new band of frequencies determined by operation of the mixing and filtering circuit 6 in conjunction with the output frequency of the multiplier 3, the amplitude signal is displayed on the oscilloscope 15 screen in a region of the screen determined by the amplitude of the output of the bias source 11. This is illustrated by trace 31 in FIG. 2.

In summary, from the above discussion it can be seen that with each pulse of the output of the amplifier 19 (FIG. 1), the output of the saw tooth generator 17 is returned to zero and the counter 18 is advanced one count. In the interim, between pulses from the amplifier 19, the signal from the saw tooth generator 17 increases in magnitude with time thereby increasing the output frequency of the voltage controlled oscillator 5 resulting in the frequencies in the signal output of the mixing and filtering circuit 6 being scanned. The increase in the output of the generator 17 also increases the horizontal deflection of the beam of the oscilloscope 15. In addition, the contents of the counter 18 produce an enable signal on one of the lines $CL_1$ through $CL_N$ resulting in the selection of the output signal of one of N frequency multipliers to be applied to the mixing and filtering circuit 6 to establish the band of frequencies in the signal S whose amplitudes comprise the output of the mixing and filtering circuit 6. Finally, the enable signal on one of the lines $CL_1$ through $CL_N$ also results in the selection, by selection circuit 14, of the output signal from one of N bias sources for summing by amplifier 9 with the output signal from the IF amplifier and detector 8. The resulting signal is applied to the vertical deflection plates 22 of the oscilloscope 15.

As mentioned above, the operation just described is performed during each time slot. A new time slot is initiated with each pulse of the output of the amplifier 19. Specifically, the counter 18 is advanced with each pulse of the amplifier 19 until the pulse following the Nth pulse occurs whereupon the counter 18 is reset and the entire process begins again.

From the previous discussion it can be seen that the mixer 7 in conjunction with the signal from the oscillator 5 acts as a scanner generating an amplitude modulated signal for each of N frequency bands in their respective time slots. It should be noted, however, that the width of the band scanned by the mixer 7 is independent of the band selected. More specifically, the width of the scan is dependent only on the difference between the minimum and maximum frequencies from the oscillator 5. In the spectrum analyzer just discussed, the difference between the minimum and maximum frequencies of the oscillator 5 is equal to $f_U - f_L$. Thus, each of the N spectrum signals displayed in FIG. 2 covers a band of frequencies $f_U - f_L$ wide.

In summary, applicant has disclosed a spectrum analyzer which uses time-shared frequency scanning apparatus in conjunction with a plurality of frequency sources and bias sources to generate and simultaneously display frequency spectrum signals for a plurality of bands in an input signal.

What is claimed is:

1. In combination:
   a plurality of sources of respectively different frequency signals;
   selection means connected to said plurality of sources for selecting the signal from any one of said plurality of sources;
   frequency shifting means connected to said selection means for frequency shifting an input signal by an amount equal to the frequency of the signal selected by said selection means; and
   means connected to said frequency shifting means for scanning a band of frequencies in the output signal from said frequency shifting means to generate a frequency spectrum signal.

2. In combination:
   a plurality of sources of respectively different frequency signals;
   means for generating signals defining time slots;
   selection means controlled by said signals defining time slots for selecting the output signal of any one of said plurality of sources for each time slot;
   a variable frequency oscillator controlled by said signals defining time slots for generating a signal which rises in frequency from a lower limit frequency to an upper limit frequency during each time slot;
   first time-shared means connected to said selection means and to said variable frequency oscillator for scanning a band of frequencies in an input signal to generate a frequency spectrum signal during each time slot; and
   second time-shared means connected to said first time-shared means for displaying the frequency spectrum signal generated during each time slot.

3. In combination:
   a plurality of sources of respectively different frequency signals;
   time-shared means connected to said sources for generating frequency spectrum signals for a plurality of frequency bands in an input signal;
   wherein said plurality of frequency bands are of the same bandwidth and each frequency band is related to the output frequency of one of said sources;
   a plurality of bias signal sources of respectively different bias levels; and
   means connected to said bias sources and to said time-shared means for simultaneously displaying said frequency spectrum signals on selected portions of a display surface.

4. In combination:
   a plurality of sources of signals of respectively different frequencies;
   means for generating pulses at a selected frequency for defining time slots;
   a counter connected to said means for generating pulses for counting said pulses and for generating counter output signals at one or more counter output ports;
   time-shared means for generating frequency spectrum signals comprising: first selection means connected to said output ports of said counter and to said sources for selecting the source determined by said counter output signals appearing at said output ports of said counter for each time slot; and means connected to said first selection means for generating a spectrum signal during each time slot by scanning a selected band of frequencies in an input signal;
   a plurality of bias signal sources of respectively different bias levels; and
   means connected to said bias signal sources, said time-shared means for generating frequency spectrum signals, and to said output ports of said counter for generating a simultaneous display of said frequency spectrum signals on selected portions of a display surface.

5. The combination of claim 4 wherein said means for generating a simultaneous display comprises:
second selection means connected to said output ports of said counter and to said bias signal sources for selecting the bias signal source determined by said counter output signals at said output ports of said counter for each time slot; and
time-shared means connected to said second selection means and connected to said time-shared means for generating frequency spectrum signals for generating a display of the respective frequency spectrum signals on different portions of an oscilloscope screen during the respective time slots.

6. In combination:
a generator of a selected frequency signal;
a first frequency multiplier connected to said generator and having a first selected multiplier factor;
a second frequency multiplier connected to said generator and having a second selected multiplier factor; and
means connected to said first and second frequency multipliers for generating a first and a second spectrum signal comprising: selection means connected to said first and second frequency multipliers for alternately selecting the output signals from said first and second frequency multipliers; a mixing means connected to said selection means for heterodyning an input signal with the selected output signal; a filter connected to said mixing means for bandpass filtering the output signal from said mixing means; a sweep frequency signal generator for repetitively generating a signal whose frequency rises from a first limit frequency to a second limit frequency; a mixer connected to said filter and to said sweep frequency signal generator for heterodyning the output signal from said filter with the output signal from said sweep frequency signal generator; filtering means connected to said mixer for filtering the output signal from said mixer; and detector means connected to said filtering means for detecting the output signals from said filtering means.

7. The combination of claim 6 further comprising:
a first bias signal source;
a second bias signal source; and means connected to said means for generating a first and a second spectrum signal and said first and second bias signal sources for simultaneously displaying said spectrum signals on a signal display device.

8. In combination:
a source of a plurality of signals of respectively different frequency;
selection means connected to said source for selecting any one of said plurality of signals;
time-shared frequency shifting means connected to said selection means for frequency shifting an input signal by an amount equal to the frequency of the selected signal;
time-shared filtering means connected to said time-shared frequency shifting means for bandpass filtering the output signals of said time-shared frequency shifting means;

time-shared frequency scanning means connected to said time-shared filtering means for frequency scanning the output signals of said time-shared filtering means to produce frequency spectrum signals; and
time-shared means connected to said time-shared frequency scanning means for displaying said frequency spectrum signals on selected portions of a display screen.

9. In combination:
a first source of a first frequency signal;
a second source of a second frequency signal;
first selection means connected to said first and second sources for selecting said first frequency signal or said second frequency signal;
a source of scanning control signals;
means connected to said source of scanning control signals for generating a scanning signal comprising a sweep of frequencies between a first limit frequency and a second limit frequency;
scanning means connected to said first selection means and to said means for generating a scanning signal for scanning a band of frequencies in an input signal to produce a frequency spectrum signal instantaneously corresponding to the amplitude of the concurrently scanned frequency of said input signal;
wherein the width of the band of frequencies scanned is determined by the difference between said first limit frequency and said second limit frequency; and
means connected to said scanning means for displaying said frequency spectrum signal.

10. The combination of claim 9 wherein said means for displaying said frequency spectrum signal comprises:
a first bias signal source;
a second bias signal source;
second selection means connected to said first and second bias signal sources for selecting an output signal from any one of said bias signal sources;
summing means connected to said scanning means and to said second selection means for generating a display signal by summing the output signal of said second selection means and said frequency spectrum signal; and
means connected to said summing means for displaying said display signal.

11. In combination:
a plurality of sources of different frequency signals;
first selection means connected to said plurality of sources for selecting the output signal of any one of said plurality of sources;
first heterodyning means connected to said first selection means for frequency shifting an input signal by an amount equal to the frequency of the signal selected by said selection means;
filtering means connected to said first heterodyning means for substantially attenuating signal components with frequencies below a first lower limit frequency and above a first upper limit frequency in the output signal from said first heterodyning means;
a tuned amplifier for amplifying signals of a selected tuned frequency and substantially attenuating other signals;
a source of scanning control signals;

a variable frequency source connected to said source of scanning control signals for generating a signal having its frequency vary in time within a band of frequencies defined by a second lower limit frequency and a second upper limit frequency;

wherein said second lower limit frequency is equal to said first lower limit frequency minus said tuned frequency and said second upper limit frequency is equal to said first upper limit frequency minus said tuned frequency;

second heterodyning means connected to said filtering means and to said variable frequency source for instantaneously frequency shifting the output signal from said filtering means by an amount equal to the concurrent frequency of the output signal from said variable frequency source;

wherein said tuned amplifier is connected to said second heterodyning means;

detector means connected to said tuned amplifier for detecting the output signal from said tuned amplifier;

a plurality of sources of different bias signals;

second selection means connected to said plurality of sources of bias signals for selecting any one of said bias signals;

summing means connected to said detector means and to said second selection means for summing the output signal from said detector means with the selected bias signal to generate a display signal; and means connected to said summing means for displaying said display signal.

* * * * *